United States Patent [19]

Brigham

[11] Patent Number: 4,516,048

[45] Date of Patent: May 7, 1985

[54] STATOR WITH NONUNIFORMLY SPACED TEETH FOR ROTATING ELECTROMAGNETIC DEVICE

[75] Inventor: Robert N. Brigham, Monroe, Conn.

[73] Assignee: The Superior Electric Company, Bristol, Conn.

[21] Appl. No.: 536,839

[22] Filed: Sep. 29, 1983

[51] Int. Cl.³ .............................................. H02K 1/12
[52] U.S. Cl. ............................... 310/254; 310/49 R; 310/156
[58] Field of Search ................. 310/49 R, 156, 254, 310/258, 259, 261–265, 179, 180, 193

[56] References Cited

U.S. PATENT DOCUMENTS

| | | | |
|---|---|---|---|
| 3,482,156 | 12/1969 | Porath | 310/49 R |
| 3,866,104 | 2/1975 | Heine | 310/49 R |
| 4,081,703 | 3/1978 | Madsen et al. | 310/49 R |
| 4,112,319 | 9/1978 | Field | 310/49 R |
| 4,385,247 | 5/1983 | Satomi | 310/49 R |
| 4,385,250 | 5/1983 | Welburn | 310/49 R |
| 4,423,343 | 12/1983 | Field | 310/49 R |

*Primary Examiner*—Mark O. Budd
*Attorney, Agent, or Firm*—John H. Crozier

[57] ABSTRACT

An electromagnetic device of the type having a rotor and a stator with magnetically coacting peripheries, with the stator having toothed pole structures, has the stator pole teeth set at nonuniform spacing to improve the operating characteristics of the device. When the device is a stepping motor, improved step accuracy is attained through reduction of residual (or detent) torque. Reduction of airborne noise is reduced in all motor types.

16 Claims, 4 Drawing Figures

STATOR WITH NONUNIFORMLY SPACED TEETH FOR ROTATING ELECTROMAGNETIC DEVICE

This invention relates to electromagnetic devices of the type in which there is a rotor and a stator having electromagnetically contacting peripheries, with the stator having teeth formed on the periphery thereof, and relates more particularly to means for improving the performance of such devices.

Devices of the type considered here include generators, AC and DC motors, and stepping motors. Although the present invention is described in detail as applied to the improvement of step accuracy in the latter, it will be understood that it may be applied as well to improve the operating characteristics of the former devices. For example, the invention is useful to substantially attenuate one or more harmonics of the fundamental voltage produced by a generator and it is also useful to reduce noise in motors. The invention accomplishes these results by providing for a stator with nonuniformly spaced teeth.

U.S. Pat. No. 4,112,319 discloses a synchronous motor in which the stator pole teeth are of nonuniform spacing. There, it was noted that motors with unequally pitched rotor and stator teeth often exhibit lower torques and are not as easy to stop at predetermined angular positions as those with equally pitched rotor and stator teeth, but the equally pitched motors are noisier and do not operate as smoothly. The motor there disclosed is intended to overcome some of the disadvantages of the two types of motors while retaining the advantages. This is accomplished through providing a motor with the rotor having uniformly pitched rotor teeth, but the stator having nonuniformly pitched stator teeth, although the stator teeth have an average pitch equal, or nearly equal, to the pitch of the rotor teeth. The present invention may also be applied to reduce noise in motors, but does not include the structural limitation of the above patent, i.e., that the average pitch of the stator teeth is equal, or nearly equal, to the pitch of the rotor teeth.

As is well known, a stepping motor is a device which translates electrical pulses into mechanical movements by causing an output shaft to rotate or move a specific incremental distance or "step" for each pulse applied to the motor. As opposed to a conventional motor which has a free-running shaft, the stepping motor shaft rotates in fixed, repeatable, known increments, resulting in the ability to accurately position. These motors are controlled by drive circuitry which provides the necessary number, sequence, and rate of pulses to achieve the desired degree of movement.

Stepping drivers including synchronous inductor motors of the general type considered here have been described in detail elsewhere, as, for example, in U.S. Pat. No. 3,117,268. There, the motor has a permanent magnet rotor and a stator comprised of a plurality of poles with windings for magnetizing the poles. Both the rotor and the stator have their coacting peripheries toothed and, when a unidirectional current is selectively applied to energize specific poles, the rotor can be made to rotate a predetermined increment (a "step"). Switching means in the drive circuitry are provided to continuously step the motor in either direction in response to input control commands or to maintain the rotor at a hold or stop position which is the position to which it was last moved.

In positioning systems, accuracy is generally of some significance and in many applications of stepping motors, step accuracy, or the ability to stop a stepping motor at a predetermined angle, is of critical importance. Because the rotor of such a motor includes a permanent magnet and the peripheries of the rotor and stator are toothed and such teeth are formed of ferromagnetic material, there is a torque developed between individual rotor and stator teeth even when no stator pole is energized. The total, or vector sum, of these torques is called the "residual torque" (or "detent torque"). Since the residual torque tends to urge the rotor to rotate one direction or the other, it has a significant effect on step accuracy. It is, therefore, desirable to reduce or eliminate residual torque so as to effect an improvement in step accuracy.

Various known parameters, such as the number of stator poles, the relative and absolute numbers of teeth on the rotor and stator, tooth configuration, drive circuitry, mechanical construction, and manufacturing technique affect step accuracy.

The present invention provides a further parameter for the improvement of the step accuracy of stepping motors of the type described by substantially eliminating residual torque and accomplishes the improvement of step accuracy while not materially diminishing other performance characteristics of the motors.

The present invention provides improved step accuracy through the substantial elimination of residual torque by providing a stator with teeth spaced nonuniformly in accordance with the teaching of the invention.

Figure 1:
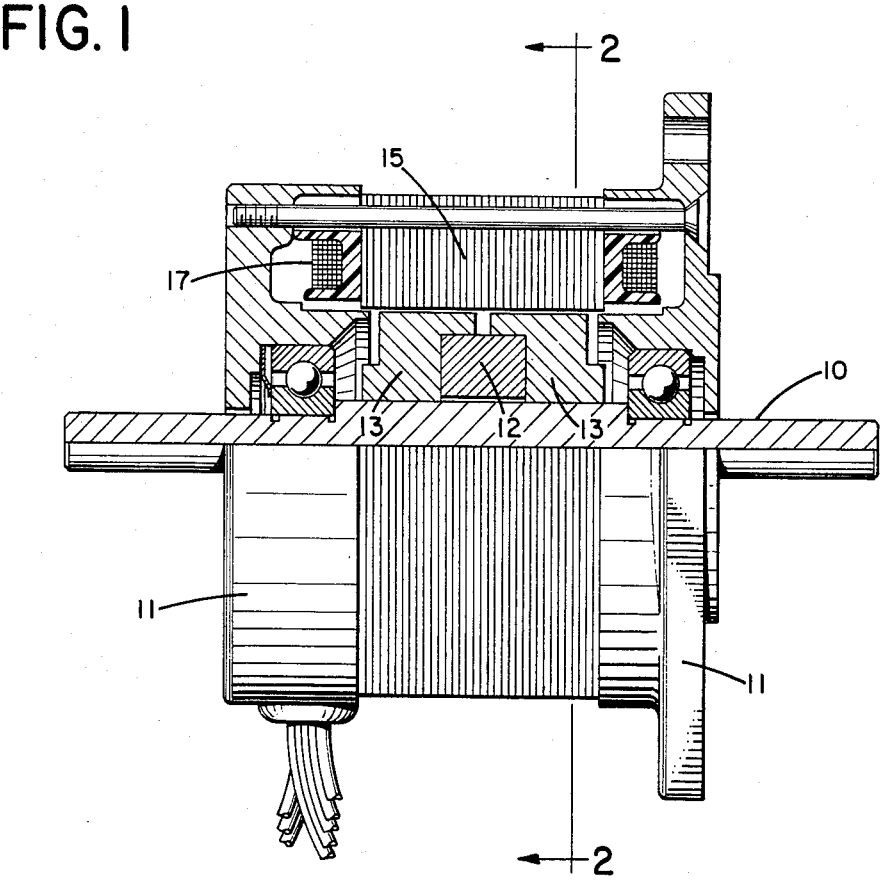
FIG. 1 is a side elevation, partly in section, of a typical synchronous induction motor.

Referring to the drawing, the motor has a rotor which includes a rotatable shaft 10 projecting beyond generally cylindrical end bells 11. The shaft 10 has a cylindrical, axially-magnetized permanent magnet 12 secured on the shaft 10 with ferromagnetic pole pieces 13 secured on the shaft 10 at each end of the magnet 12. The peripheries of the pole pieces are toothed to provide a plurality of teeth as at 14. The stator of the motor includes an annular ring 15 formed of laminated ferromagnetic material and fixedly positioned in the end bells 11 so that it is radially aligned around the rotor. The stator is formed, in the specific embodiment shown, to have eight poles 16, although the stator may have any number of poles which are multiples of two. Each pole 16 has a coil 17 associated therewith for magnetizing the pole according to the direction of electrical current in the coil. The pole pieces are formed to provide teeth as at 18 on their inner peripheries.

Although in a typical stepping motor the pitch of the rotor teeth 14 is uniform and the pitch of the stator teeth 18 is also uniform but not necessarily equal to the pitch of the rotor teeth, in the present invention, the pitch of the rotor teeth is uniform, but the pitch of the stator teeth is nonuniform. Because the differences in the spacing of the stator teeth are relatively small, such differences have not been drawn in FIG. 2.

Figure 3:
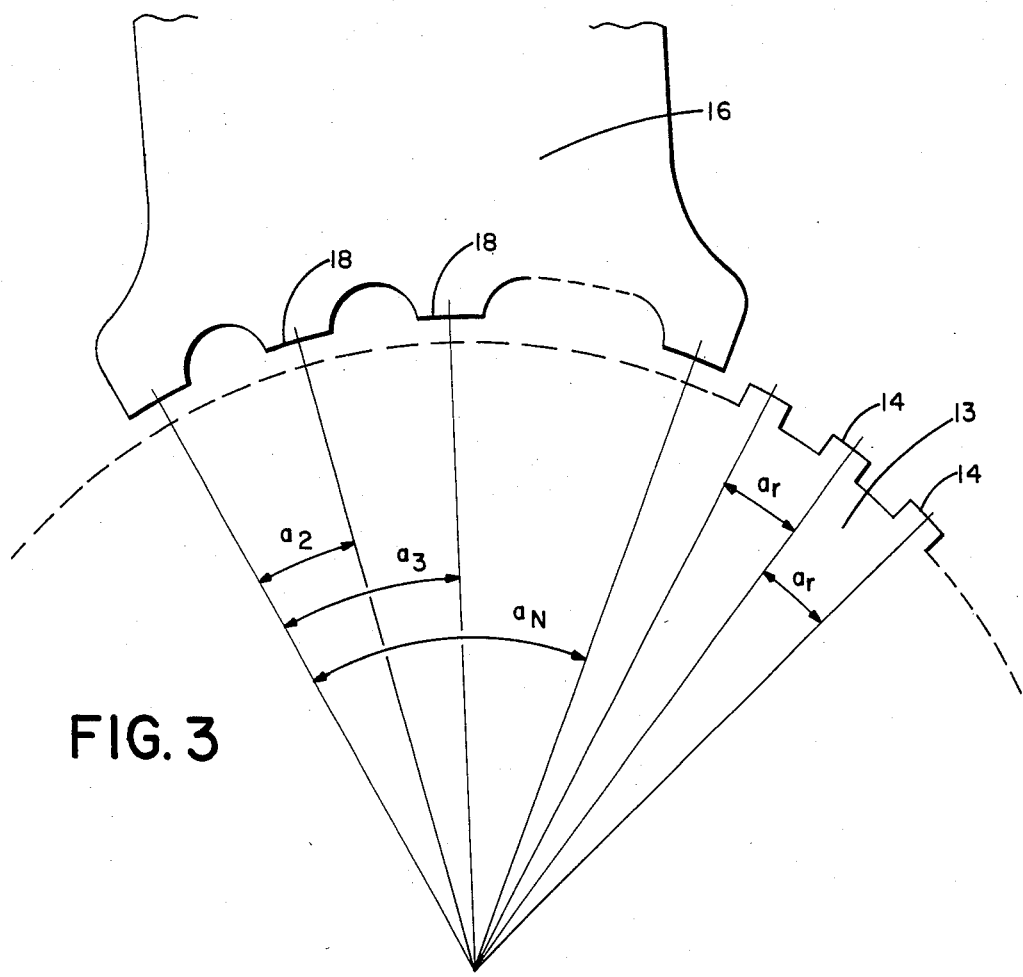
FIG. 3 is a schematic indicating the dimensional relationships of the stator and rotor teeth.

FIG. 3 is a schematic of the present invention showing a stator pole 16 having N teeth 18 of varying spacing and a corresponding pole piece 13 with teeth 14 spaced equally at $a_r$ apart. The first and second teeth of the stator are spaced $a_2$ apart, the third tooth is spaced $a_3$ from the first, and the Nth tooth is spaced $a_N$ from the first.

Figure 4:
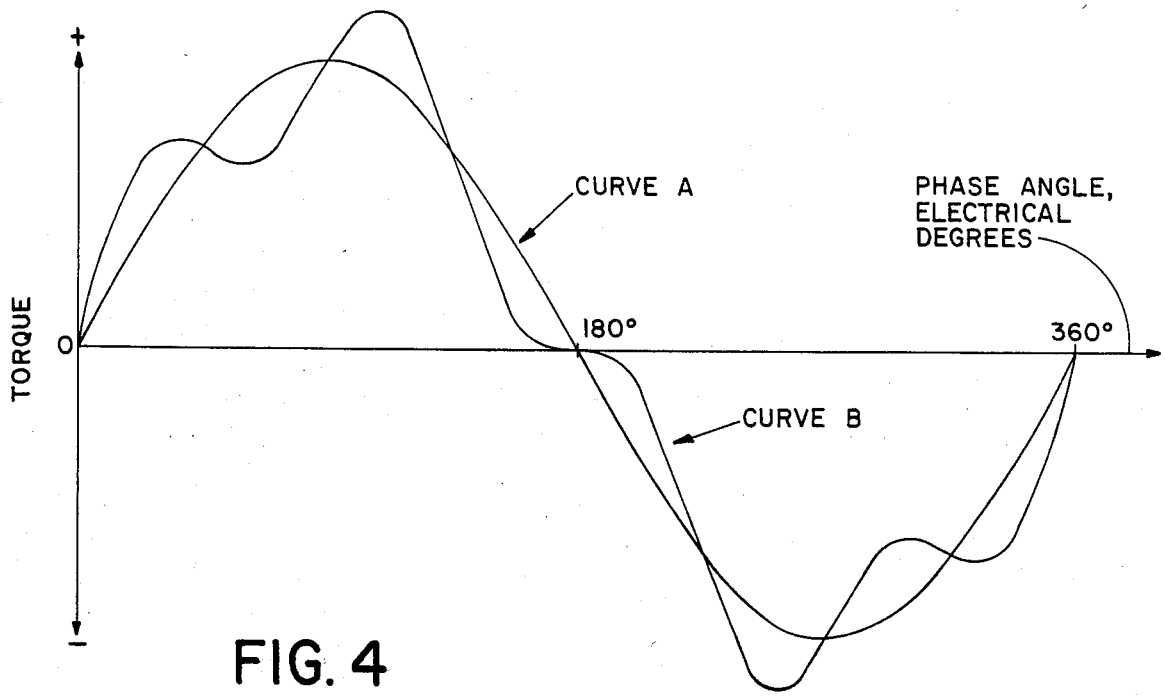
FIG. 4 shows torque vs. phase angle curves typical of the tooth structures shown on FIG. 2.

FIG. 4 shows idealized characteristic sinusoidal curves of torque vs. phase angle which can be produced as a rotor tooth moves 360 electrical degrees, i.e., as the rotor tooth moves arcuately through an angle equal to one rotor tooth pitch. Curve A shows the pure sine wave of the fundamental torque vs. displacement angle chaaracteristic and Curve B shows the fundamental distorted by a fourth harmonic of the fundamental. Actual configurations of rotor and stator teeth may produce torque-angle characteristics containing other harmonics, but that is unimportant for purposes of this discussion.

It is known that the amount of residual torque evidenced by a motor with uniformly spaced stator teeth is substantially proportional to the strength of the torque-angle harmonic the number of which is the same as the number of magnetic poles of the stator. For example, in a motor with four magnetic stator poles, the residual torque would be substantially proportional to the fourth harmonic of the fundamental torque-angle characteristic. It has also been found, using this example, that residual torque would also be proportional to harmonics that are multiples of the fourth harmonic, e.g., the eighth, the twelfth, etc.; however, the fourth harmonic has the strongest relationship. Curve B of FIG. 4 represents the torque-angle characteristic of a motor with four magnetic stator poles and equally spaced stator teeth and shows, in an idealized manner, distortion of the fundamental torque-angle characteristic by the fourth harmonic.

Figure 2:
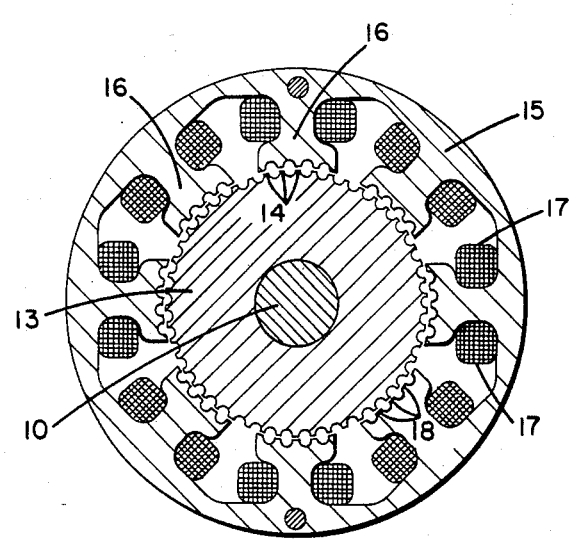
FIG. 2 is a view taken on the line 2—2 of FIG. 1.

It should be noted that although FIG. 2 shows a stator with eight mechanical poles, motors having such mechanical structure are typically two-phase motors with four of the mechanical poles connected in one phase and the other four mechanical poles connected in the other phase, thus resulting in two identical phases with four magnetic poles. For the purpose of the following discussion, such a motor exhibits the torque-angle characteristic of a four-pole motor.

This invention substantially attenuates the residual torque by essentially eliminating the harmonic associated with the residual torque. This is accomplished by providing a stator structure in which the teeth are spaced nonuniformly in such a manner that the resultant amplitude of the particular harmonic to be eliminated is zero i.e., the vector sum of the particular torque-angle harmonic curves produced by the interaction of each tooth of the stator with the rotor teeth is zero. In other words, referring to FIG. 4, the distortions shown by Curve B are eliminated and the torque-angle characteristic of the teeth on a single pole would be more nearly approximated by Curve A. The necessary nonuniform spacing can be obtained when the following equation is satisfied for each stator pole:

$$\sum_{n=1}^{n=N} \cos(hn_r) [a_n - (n-1)a_r - R] = 0,$$

where $$R = \sum_{n=1}^{n=N} \frac{a_n - (n-1)a_r}{N},$$

$a_1 = 0$, $a_2, a_3, a_n$ = the dimensions shown on FIG. 3, in mechanical degrees, $n_r$ = number of rotor teeth, $N$ = number of stator teeth on the pole, $a_r = 360°$ mechanical/$n_r$, and $h$ = an integer representing the harmonic to be attenuated, e.g., 4 for the fourth harmonic.

More generally, it is not necessary that the tooth spacings on each pole satisfy the above equation if the vector sum of the values produced by the equation for each of the poles equals zero.

Of course, it is also not necessary that the nonuniform tooth spacings on one pole be identical to the spacings on any other pole, only that the spacings on each pole or all poles acting in concert satisfy the above equation. This technique may also be employed to decrease harmonics of the fundamental torque-angle characteristic other than the harmonic related to residual torque, as may be beneficial in other aspects of stepping motor design.

In practicing the invention, it is found that not only is step accuracy of a stepping motor improved, but that other performance characteristics of the motor are not materially reduced.

Although the invention has been described as applied to a stepping motor with a tooth rotor, it will be understood that it is equally applicable to motors having toothless rotors. In that case the rotor would have a series of magnetic poles, -N-S-N-S-N-S-, disposed radially on the rotor and, in the above equation, the number and spacing of rotor poles would be substituted for the number spacing, respectively, of rotor teeth.

Since certain changes may be made in carrying out the above-described invention without departing from the scope thereof, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

I claim:

1. In an electromagnetic device of the type in which there is a rotor and a stator having toothed, electromagnetically coacting peripheries, the stator having poles and at least one winding comprising coils wound upon the poles to form magnetic poles upon energization of the winding, the improvement comprising having the stator teeth set at nonuniform spacing so that the vector sum of the values determined by the following relationship for each pole is zero:

$$\sum_{n=1}^{n=N} \cos(pn_r) [a_n - (n-1)a_r - R],$$

where $$R = \sum_{n=1}^{n=N} \frac{a_n - (n-1)a_r}{N},$$

-continued
$$a_r = \frac{360° \text{ mechanical}}{n_r},$$

$n_r$=number of rotor teeth,
N=number of stator teeth on the pole,
$a_1 = 0$,
$a_n$=center-to-center distance from the tooth at one edge of the pole to the tooth designated by a numeral subscript, the tooth at the other edge of the pole being designated as N, in mechanical degrees, and
p=an integer.

2. In an electromagnetic device of the type in which there is a rotor and a stator having electromagnetically coacting peripheries, the rotor being toothless and having magnetic poles uniformly disposed radially on the surface thereof, the stator having toothed poles and at least one winding comprising coils wound upon the poles to form magnetic poles upon energization of the winding, the improvement comprising having the stator teeth set at nonuniform spacing so that the vector sum of the values determined by the following relationship for each stator pole is zero.

$$\sum_{n=1}^{n=N} \cos(pn_r)[a_n - (n-1)a_r - R],$$

where $$R = \sum_{n=1}^{n=N} \frac{a_n - (n-1)a_r}{N},$$

$$a_r = \frac{360° \text{ mechanical}}{n_r},$$

$n_r$=number of rotor magnetic poles,
N=number of teeth on the stator pole,
$a_1 = 0$,
$a_n$=center-to-center distance from the tooth at one edge of the pole to the tooth designated by a numeral subscript, the tooth at the other edge of the pole being designated as N, in mechanical degrees, and
p=an integer.

3. The improvement, as defined in claim 1, further defined, wherein the value determined by the relationship for each individual pole is zero.

4. The improvement, as defined in claim 2, further defined, wherein the value determined by the relationship for each individual pole is zero.

5. The improvement, as defined in claim 1, further defined, wherein the electromagnetic device is a generator.

6. The improvement, as defined in claim 2, further defined, wherein the electromagnetic device is a generator.

7. The improvement, as defined in claim 1, further defined, wherein the electromagnetic device is a motor.

8. The improvement, as defined in claim 2, further defined, wherein the electromagnetic device is a motor.

9. The improvement, as defined in claim 1, further defined, wherein the electromagnetic device is a stepping motor.

10. The improvement, as defined in claim 2, further defined, wherein the electromagnetic device is a stepping motor.

11. In an electrical stepping motor of the type having a toothed rotor having uniform tooth spacing and a stator having toothed poles energized by at least one winding comprising coils wound upon the poles, the improvement comprising having the pole teeth set at nonuniform spacing so that the vector sum of the values determined by the following relationship for each pole is zero:

$$\sum_{n=1}^{n=N} \cos(pn_r)[a_n - (n-1)a_r - R],$$

where $$R = \sum_{n=1}^{n=N} \frac{a_n - (n-1)a_r}{N},$$

$$a_r = \frac{360° \text{ mechanical}}{n_r},$$

$n_r$=number of rotor teeth,
N=number of stator teeth on the pole,
$a_1 = 0$,
$a_n$=center-to-center distance from the tooth at one edge of the pole to the tooth designated by a numeral subscript, the tooth at the other edge of the pole being designated as N, in mechanical degrees, and
p=an integer.

12. In an electrical stepping motor of the type having a toothed rotor having uniform tooth spacing and a stator having toothed poles energized by at least one winding comprising coils wound upon the poles, the improvement comprising having the pole teeth set at nonuniform spacing so that the vector sum of the values determined by the following relationship for each pole is zero:

$$\sum_{n=1}^{n=N} \cos(hn_r)[a_n - (n-1)a_r - R],$$

where $$R = \sum_{n=1}^{n=N} \frac{a_n - (n-1)a_r}{N},$$

$$a_r = \frac{360° \text{ mechanical}}{n_r},$$

$n_r$=number of rotor teeth,
N=number of stator teeth on the pole,
$a_1 = 0$,
$a_n$=center-to-center distance from the tooth at one edge of the pole to the tooth designated by a numeral subscript, the tooth at the other edge of the pole being designated as N, in mechanical degrees, and
h=the number of a harmonic of the fundamental torque-angle characteristic of the motor.

13. In an electrical stepping motor of the type having a toothless rotor having magnetic poles uniformly disposed radially on the surface thereof and a stator having toothed poles energized by at least one winding comprising coils wound upon the poles, the improvement comprising having the pole teeth set at nonuniform spacing so that the vector sum of the values determined by the following relationship for each stator pole is zero:

$$\sum_{n=1}^{n=N} \cos(pn_r)[a_n - (n-1)a_r - R],$$

where $$R = \sum_{n=1}^{n=N} \frac{a_n - (n-1)a_r}{N},$$

$$a_r = \frac{360° \text{ mechanical}}{n_r},$$

$n_r$ = number of rotor magnetic poles,
N = number of teeth on the stator pole,
$a_1 = 0$,
$a_n$ = center-to-center distance from the tooth at one edge of the stator pole to the tooth designated by a numeral subscript, the tooth at the other edge of the stator pole being designated as N, in mechanical degrees, and
p = the number of magnetic poles included in each winding.

14. In an electrical stepping motor of the type having a toothless rotor having magnetic poles uniformly disposed radially on the surface thereof and a stator having toothed poles energized by at least one winding comprising coils wound upon the poles, the improvement comprising having the pole teeth set at nonuniform spacing so that the vector sum of the values determined by the following relationship for each stator pole is zero:

$$\sum_{n=1}^{n=N} \cos(hn_r)[a_n - (n-1)a_r - R],$$

where $$R = \sum_{n=1}^{n=N} \frac{a_n - (n-1)a_r}{N},$$

$$a_r = \frac{360° \text{ mechanical}}{n_r},$$

$n_r$ = number of rotor magnetic poles,
N = number of teeth on the stator pole,
$a_1 = 0$,
$a_n$ = center-to-center distance from the tooth at one edge of the stator pole to the tooth designated by a numeral subscript, the tooth at the other edge of the stator pole being designated as N, in mechanical degrees, and
h = the number of a harmonic of the fundamental torque-angle characteristic of the motor.

15. The improvement, as defined in claim 14, further defined, wherein the value determined by the relationship for each individual pole is zero.

16. The improvement, as defined in claim 14, further defined, wherein the value determined by the relationship for each individual pole is zero.

* * * * *